(12) United States Patent
Pellegrin

(10) Patent No.: US 6,872,240 B2
(45) Date of Patent: Mar. 29, 2005

(54) METHOD AND APPARATUS FOR FILTERING AN AIR STREAM USING AN AQUEOUS-FROTH TOGETHER WITH NUCLEATION

(75) Inventor: Roy J. Pellegrin, Wailuku, HI (US)

(73) Assignee: Peletex, Inc., Wailuku, HI (US)

( * ) Notice: Subject to any disclaimer, the term of this patent is extended or adjusted under 35 U.S.C. 154(b) by 106 days.

(21) Appl. No.: 10/447,437

(22) Filed: May 29, 2003

(65) Prior Publication Data

US 2004/0020361 A1 Feb. 5, 2004

Related U.S. Application Data

(63) Continuation-in-part of application No. 09/889,235, filed as application No. PCT/US00/27771 on Oct. 4, 2000, now Pat. No. 6,616,733.
(60) Provisional application No. 60/384,562, filed on May 30, 2002.

(51) Int. Cl.[7] .......................... B01D 47/02; B01D 47/04
(52) U.S. Cl. ............................ 95/150; 95/205; 95/226; 95/241; 96/279
(58) Field of Search .................... 95/150, 205, 226, 95/241; 96/279, 351; 261/115, 121.1, DIG. 26

(56) References Cited

U.S. PATENT DOCUMENTS

| | | | | |
|---|---|---|---|---|
| 3,650,091 A | * | 3/1972 | Li ................................ | 95/150 |
| 3,830,041 A | * | 8/1974 | Huppke ........................ | 96/177 |
| 4,003,724 A | * | 1/1977 | Payne et al. ................... | 95/19 |
| 4,009,010 A | * | 2/1977 | Sauer et al. ................... | 95/150 |
| 4,193,774 A | * | 3/1980 | Pilat ............................. | 95/71 |
| 5,039,319 A | * | 8/1991 | Glass et al. ................... | 96/176 |
| 5,261,933 A | * | 11/1993 | Greene ......................... | 95/150 |
| 6,080,320 A | * | 6/2000 | von Phul ...................... | 210/703 |
| 6,083,307 A | * | 7/2000 | Dular ........................... | 96/279 |

\* cited by examiner

*Primary Examiner*—Frank M. Lawrence
(74) *Attorney, Agent, or Firm*—Bruce H. Johnsonbaugh

(57) ABSTRACT

A method for urging contact between contaminants in an air stream and the wet surfaces of an aqueous-froth, and additional means of limiting the froth to a predetermined volume are provided. A wide spectrum of solution micro-droplet sizes (0.001 to 1000 micron) is introduced into a contaminated air stream. Micro-droplets suspended in the air stream remove contaminants by contact, collide and coalesce in the dynamics of the air stream and are removed by inertia. Smaller micro-droplets remain suspended in the air stream. The smallest micro-droplets evaporate, increasing the solution vapor pressure of the air stream. The humidified or saturated, contaminated air stream continuously expands the surface area of the solution reservoir exponentially into an aqueous froth of tiny bubbles. Airflow velocity drops in the micro-atmosphere inside each bubble of the froth. Contaminants and solution micro-droplets suspended in the air, inside the bubbles, settle out by the acceleration of gravity into the wet surfaces inside of each bubble. The froth is dewatered by condensation of the bubble walls, solution vapor, and micro-droplets, with trapped contaminants, onto the cold air, adjacent cold surfaces, and cold refrigerant coils. The liquid solution and contaminants drain from the refrigerant coils into the solution reservoir. Solution micro-droplets remaining in the air stream are drawn through a centrifugal blower/droplet separator and are thrown onto the blower housing to drain back into the solution reservoir. The air stream is passed through condensing refrigerant coils to reheat the air stream and reduce relative humidity. Variations including scaling, alternative methods of fogging, and additional applications are described.

14 Claims, 10 Drawing Sheets

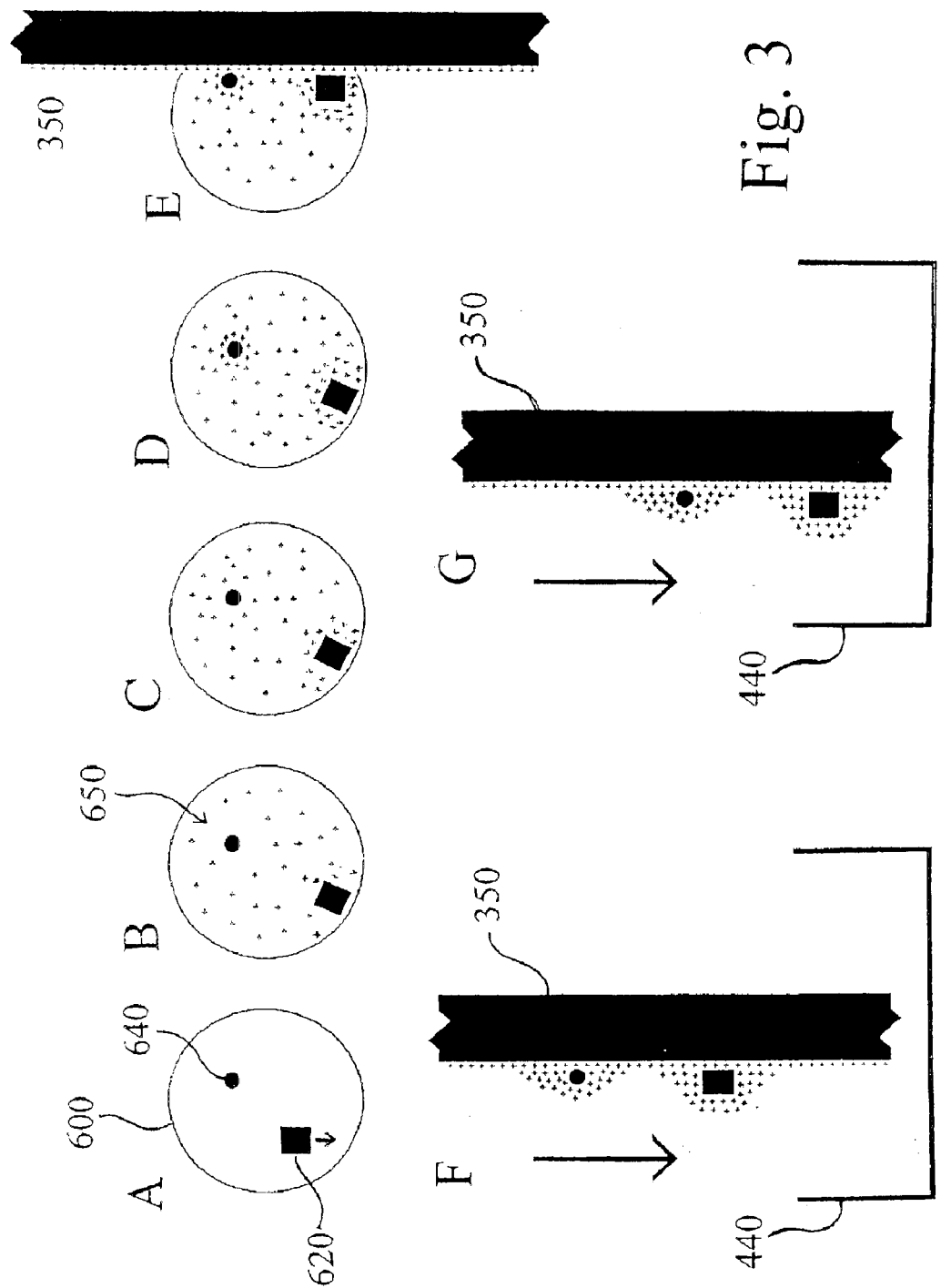

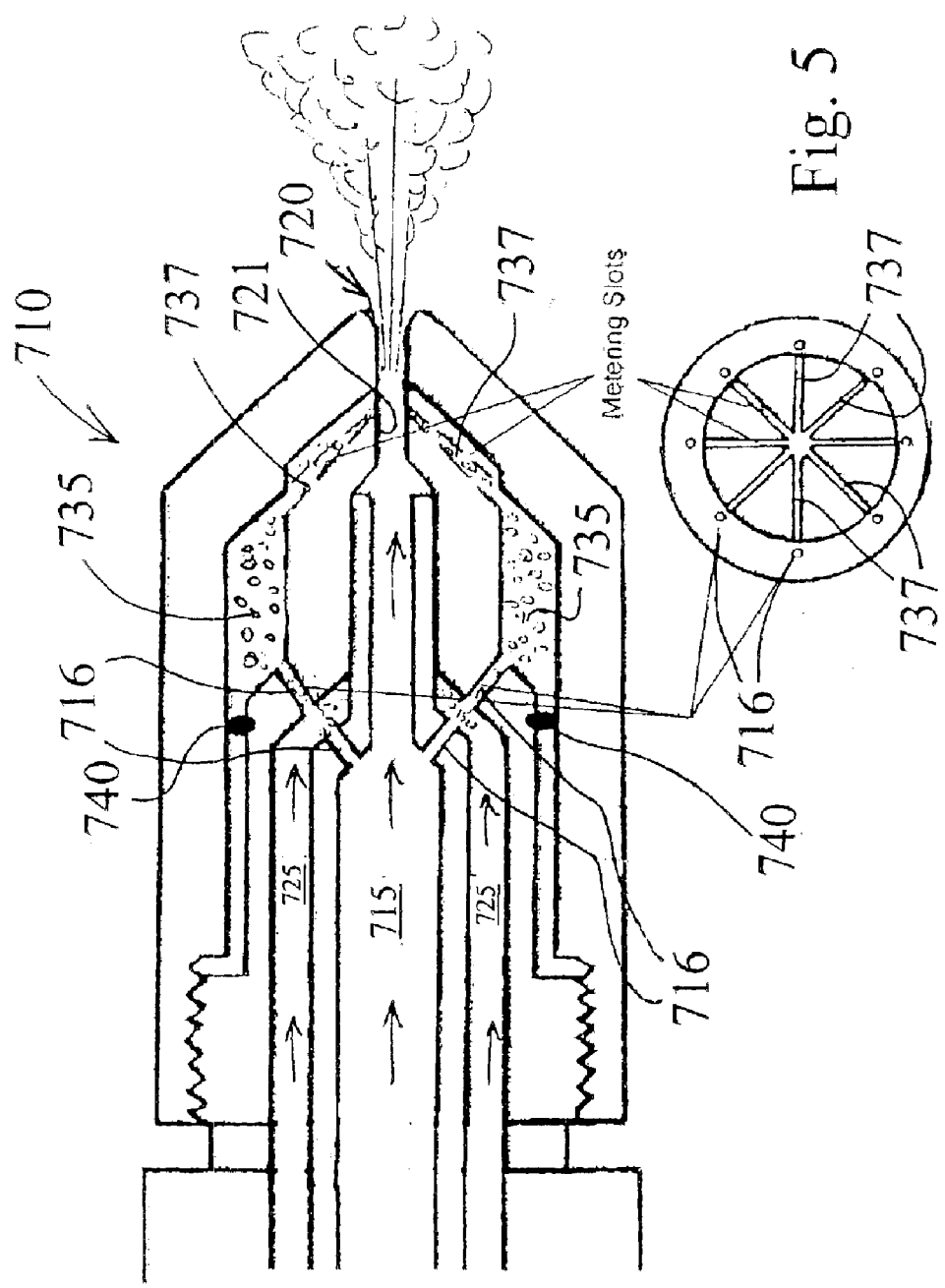

METHOD AND APPARATUS FOR FILTERING AN AIR STREAM USING AN AQUEOUS-FROTH TOGETHER WITH NUCLEATION

CROSS REFERENCES TO RELATED APPLICATIONS

This application is a continuation-in-part of U.S. patent application Ser. No. 09/889,235 filed Jul. 10, 2001, now U.S. Pat. No. 6,616,733, which is a 371 of PCT/US00/27771, filed Oct. 4, 2000, and entitled, "Method and Means for Filtering an Air Stream with an Aqueous Froth." This application also claims the benefit of and priority from U.S. provisional application Ser. No. 60/384,562 filed May 30, 2002.

BACKGROUND—BRIEF SUMMARY OF THE INVENTION

Generally, the invention of this application relates to filtering an air stream. Specifically, the invention relates to improvements to the technique of removing gaseous, liquid, and solid contaminants from an air stream with an aqueous-froth as described in parent application Ser. No. 09/889,225, incorporated herein by reference.

The key aspect of the present invention is the novel combination of using "nucleation" in concert with an aqueous froth (shown best in FIGS. 3A–3G). In the "nucleation" technique, the incoming contaminated air stream is saturated with a fine mist produced by fogger nozzles, causing super-saturation of the air stream. The sub-micron contaminants act as condensation nuclei in the supersaturated air stream, in much the same fashion in which rain droplets are formed. The contaminants become encased in an airborne fluid aerosol. The encased contaminants are "trapped" inside bubbles continuously formed in an aqueous froth. Finally, the bubbles carrying the encased and trapped contaminants are collapsed or coalesced in a controlled fashion. The contaminants, in the form of large condensates, are easily deposited into a liquid decontamination reservoir.

The filter of the present invention will effectively remove particles as small as 0.005 micron in diameter, including such agents as Industrial sulfate aerosols, biological agents such as Corona virus with a mean diameter of 0.07 microns, Variola major (Smallpox virus) with a mean diameter of 0.2–0.3 microns, chemical weapon agents such as VX, HD, Sarin, Mustards, radiological aerosols, as well as larger agents such as anthrax spores.

Aside from other advantages, such as low maintenance cost and low energy consumption, the combined nucleation and aqueous-froth air filter of the present invention has no minimum pore size found in conventional air filters. It essentially mimics the atmospheric water cycle.

According to the present invention, a contaminated air stream is saturated with a fine mist generated with specially designed fogger nozzles. This produces a range of very small droplet sizes quickly supersaturating the incoming air stream. Although the Kelvin curvature effect limits the size of a cloud droplet in the atmosphere, the controlled conditions inside the aqueous-froth air filter enable smaller droplet and vapor formation without the limiting/counteracting effects of evaporation found in nature.

A key operational point here is that sub-micron contaminants in the air act as condensation nuclei causing heterogeneous nucleation, effectively encasing the contaminants in an airborne fluid aerosol. Bubbles are then generated using the incoming contaminated supersaturated air stream, making controlled supersaturated encapsulated micro-atmospheres. In addition to heterogeneous nucleation, the controlled micro-atmosphere in the bubbles also encourages collision coalescence, reduces mobility of target aerosols, and prolongs contact between the decon solution and the contaminants. In a subsequent stage, the air is cooled forcing additional internal condensation and controlled bubble collapse, as well as coalescence. The resulting large condensate is then easily deposited into the liquid decontamination reservoir in the same manner as raindrops forming, thereby removing contaminants from the air stream and safely containing them in the decon solution. An additional dehumidification stage ensures that any leftover aerosols are removed and trapped prior to the clean decontaminated air stream exiting the stage.

The filter is capable of extremely high efficiency, wet or dry, super-micron and sub-micron aerosol removal, and is ideally suited for filtering particles in the 0.1 micron range. It should therefore be an excellent high efficiency filter for removal of hazardous aerosols of interest.

The present invention is capable of removing hazardous radiological aerosols as well as removal and neutralization of chemical and biological aerosols. The unit will have operating costs significantly lower than HEPA systems and will have higher efficacy. The projected unit cost in mass production is under one thousand dollars. This cost effective implementation of the invention should easily scale to large systems.

Existing air filters are inadequate for current as well as emerging threats. There is an urgent need to develop efficient low cost air filtration methods capable of high efficiency removal of aerosolized chemical and biological weapon (CBW) agents as well as radiological agents from contaminated air. This is a challenge as these agents exist in aerosol, vapor, or particulate form in a wide range of sizes.

Current state-of-the-art air filtration technology is based on sixty year old technology. HEPA/ULPA filters use permeable substrates in an air stream to trap particles. Problems with this technology include high energy and maintenance costs, limitations on the effective particle size that can be filtered at high airflow, and increase in operation cost and degradation of performance over time. HEPA filters are relatively ineffective on CW (chemical weapon) agents, and trapped BW (biological weapon) contaminants remain active, thus such filters must be disposed of as hazardous waste. Other filtration techniques require using combinations of technologies increasing cost, complexity and mass, whereas a single filter of the present invention should be sufficient for mitigating NCBW (nuclear, chemical, biological weapon) threat.

The aqueous-froth filter, shown in Ser. No. 09/889,225, can remove large quantities of nuisance dust generated while sanding when finishing gypsum wall panels. A portion of the nuisance dust is sub-micron in size. Although all perceivable contaminants are removed from the air stream, sub-micron contaminants not present in macroscopic amounts can be drawn through the aqueous-froth air filter and build up in the vacuum source. Sub-micron contaminants can stay suspended in the air, inside the bubbles of the froth, until the bubble wall is absorbed by the wet surfaces of the saturated fiber element, or torn between the surface tension with wet surfaces of the filter and the surface friction of the bubble in the air steam. If the contaminated air inside the bubble is released at the top of the froth column, near the saturated fiber element, sub-micron contaminants can pass through the saturated fiber elements to the vacuum source.

The present invention provides, among other things, an aqueous-froth filter which includes nucleation techniques to more thoroughly filter super and sub-micron contaminants from an air stream. Air filter protection from hazardous aerosolized contaminants; chemical, biological, and radiological weapons of mass destruction, or relief from smog (for example acid aerosols), allergens (bio-active aerosols), and undesirable sub-micron particulates (abrasives, corrosives) require a more complete and reliable method to urge contact and coalescence between sub-micron contaminants, the wet surfaces of the aqueous froth, and the filtering solution than the original aqueous-froth filter, shown in parent application Ser. No. 09/889,225. Additionally, the horizontal airflow design requires a reliable, low-maintenance, continuous-duty, means of limiting the froth to a predetermined volume that is independent of the turbulence in the solution reservoir.

OBJECTS

A primary object of the invention is to provide a filter capable of effectively removing contaminants from an airstream which are 0.005 micron and larger in size.

A further object of the invention is to provide a filter which combines the use of nucleation together with an aqueous-froth to achieve better filtering performance.

A further object is to provide a filtering system capable of removing nuclear, chemical and biological weapon agents from an airstream.

Yet another object is to provide a filter system capable of protecting governmental, military and private buildings and inhabitants of those buildings from airborne chemical and biological weapons.

A further object is to provide a filtering system capable of containing and removing hazardous aerosols from a clean-up site.

A further object is to provide a filtering system capable of reacting with and removing carbon dioxide and other effluents from an air stream from a factory or other emission source.

Other objects and advantages will become apparent from the following description and drawings.

BRIEF DESCRIPTION OF THE DRAWINGS

FIGS. 3A–3G constitute a schematic representation illustrating the theoretical concept of operation of the nucleation aspect of the invention;

FIGS. 4A–4E illustrate a liquid fogger nozzle, wherein FIG. 4A illustrates the assembled nozzle and FIGS. 4B–4E illustrate components of the liquid fogger nozzle;

FIG. 5 is a schematic illustration showing a sub-micron fogger nozzle;

FIGS. 6A–6E illustrate the construction of the fogger nozzle shown in FIG. 5 wherein FIG. 6A illustrates the assembled fogger nozzle and FIGS. 6B–6E illustrate components of the fogger nozzle;

DETAILED DESCRIPTION

Figure 1:
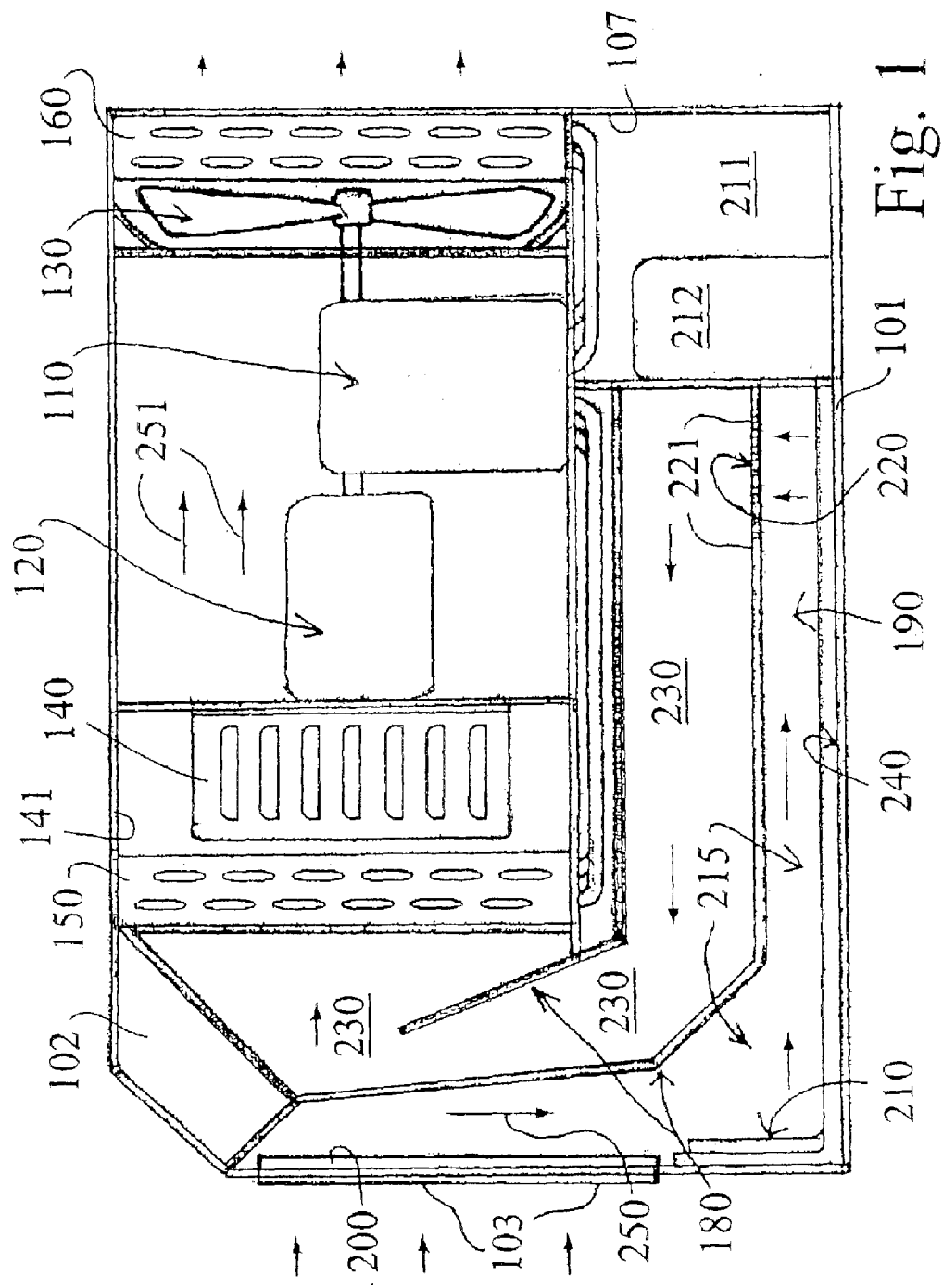
FIG. 1 is a schematic representation of one embodiment of aqueous-froth filter of the present invention.

A first embodiment of the invention is shown in FIG. 1 in exemplary form as a horizontal-flow, aqueous-froth air filter for a standard two-foot by two-foot intake air duct for an HVAC unit. The materials selected and described herein do not limit the scope of the invention. The action of the aqueous-froth and the fogger nozzles are not shown in FIG. 1 for clarity; however, action of the froth and nozzles are shown in the embodiment shown in FIG. 2.

A modified standard window-type air conditioner 100 (G.E. model # AGD 12 AA) supplies the refrigerant system 110, electric motor 120, fan blade 130, centrifugal-blower/droplet separator 140, chassis 101, and electronic controls, and are not part of the discovery of the invention.

The invention changes the internal ducting of the air conditioner 100 to draw air in through inlet 103, through the evaporative refrigerant coil 150, pass the air through the air conditioning unit 100, and exhaust the air stream through the condensing refrigerant coil 160. The air conditioner functions like a dehumidifier, however the refrigerant coils 150, 160 have substantially more radiant surfaces. The conventional fan blade 130 and the centrifugal blower 140 work together to move the air through the filter unit.

An anodized aluminum frame (not shown) 24 inches high, 24 inches wide, and 30 inches long is built to contain all the components of the horizontal aqueous-froth air filter inside a standard two-foot by two-foot, air-inlet duct for a HVAC unit.

Transparent acrylic panels enclose the frame and constitute the partitions that define the ducting 180, reservoir 190, and chambers.

A standard particulate air filter 200 for an HVAC unit is held in place by an aluminum bracket attached to the aluminum frame.

Fogger nozzles 210 are connected to a liquid transfer pump 212 and an air compressor 211 in the storage compartment 107.

A fogging chamber 215 is formed from acrylic partitions parallel to the bottom enclosing partition.

A sieve 220 includes a partition 221 between fogging chamber 215 and frothing chamber 230 wherein the partition has a plurality of holes formed therethrough. The size of the holes in sieve 220 controls the size of the bubbles in the froth.

Frothing chamber bubbles (not shown in FIG. 1 for clarity) expand the surface area of the solution exponentially Evaporative coils 150 dewater the froth, condense micro-droplets, and change solution vapor into liquid phase. Liquid solution with contaminants drains from the refrigerant coils 150 into the solution reservoir 240.

A centrifugal blower/droplet separator 140 draws any micro-droplets suspended in the air stream after the evaporative refrigerant coil 150 into the blower 140 and throws the droplet onto the surface of the blower housing 141 to drain back into the solution reservoir 240.

Condensing coils 160 return the heat to the air stream with additional heat from the electric motor 120.

Filtering solution additives can neutralize reactive chemicals, sterilize bio-aerosols, and enhance or inhibit froth formation.

Utility chamber 102 is for a liquid transfer pump, an air compressor, and solution chemicals.

Operation of FIG. 1 Embodiment

Relative low pressure of the embodiment shown in FIG. 1 is created throughout the filter as the electric fan 130 draws air into the particulate filter 200 and forces the air out of the condensing refrigerant coil 160.

A portion of the filtering-solution is drawn out of the solution reservoir 240, into the frothing chamber 230 by low pressure.

The contaminated air stream shown by arrow 250 is drawn into a standard HVAC particulate filter 200 to keep macro-contaminants from entering the solution reservoir 240.

Fogger nozzles 210 introduce a wide spectrum of micro-droplet radii (0.001 to 1000 micron) (not shown in FIG. 1) into the contaminated air stream 250. Various sized micro-droplets with different inertia sweep contaminants out of the air stream by contact in the dynamic environment of the fogging chamber 215. Some of the micro-droplets collide and coalesce and are removed from the air stream by inertia, smaller micro-droplets remain suspended in the air stream, and the smallest micro-droplets evaporate and raise the solution vapor pressure of the air stream.

The air stream 250 accelerates as it is drawn into a narrowed airflow passageway in the fogging chamber 215 above the solution reservoir 240.

The surface area of the solution reservoir 240 traps most of the massive aerosols and the droplets too large to be carried along by the airflow.

The saturated air stream is drawn through a diffusing sieve 220 and into the frothing chamber 230. The surface area of the filtering solution is expanded exponentially, continuously creating an aqueous-froth of tiny bubbles (froth not shown in FIG. 1). Contaminants and micro-droplets are suspended in the air inside the bubbles (shown best in FIG. 3). Airflow velocity, relative to the contaminants, is reduced in the micro-atmosphere created inside each bubble of the froth. The acceleration of gravity overcomes the air resistance of the surface of the contaminant or micro-droplet. Contaminants and micro-droplets settle out onto the wet surface inside the bubbles of the froth, as shown best in FIG. 3. Some contaminants and micro-droplets remain suspended in the air, inside the bubbles. As bubbles are cooled, further condensation and nucleation occurs.

The outside surfaces of the bubbles and the surface area of the solution in the frothing chamber remove any contaminants escaping from bursting bubbles. Further contaminants now suspended in liquid airborne aerosols are removed by continuing condensation and dehumidification.

The froth (not shown in FIG. 1) is drawn to the cold evaporative refrigerant coils 150 by low pressure.

A localized zone of froth, proximal to the refrigerant coils 150, begins to cool by thermal conduction, increasing the water vapor pressure, and super saturating the air inside the bubbles (not shown in FIG. 1).

As the bubbles are drawn through the evaporative refrigerant coil 150, the solution vapor inside the bubbles condenses on available nuclei and suspended micro-droplets, trapping the contaminants in liquid solution micro-droplets, suspended in the air, inside the bubbles.

The bubble walls condense on the cold surfaces of the refrigerant coil 150, releasing the super saturated atmosphere inside the bubbles to condense in mid air like rain, or onto the refrigerant coil, as well (see FIG. 3).

The liquid solution, with trapped contaminants, drains off the evaporative refrigerant coil 150 into the solution reservoir 240.

The solution reservoir 240 is maintained at 25° C. by routing solution pipes to fogger nozzles 210 in thermal communication with a heat source. (hot water pipe)

Liquid solution droplets suspended in the air stream after being drawn through the evaporative refrigerant coil 150 are drawn into a centrifugal blower 140, thrown unto the blower housing 141, and drained back into the solution reservoir 240.

The air stream shown at arrows 251 is exhausted through a condensing refrigerant coil 160 to replace the heat removed from the air stream, increase air volume, and reduce relative humidity.

Detailed Description of FIGS. 2–10

Figure 2:
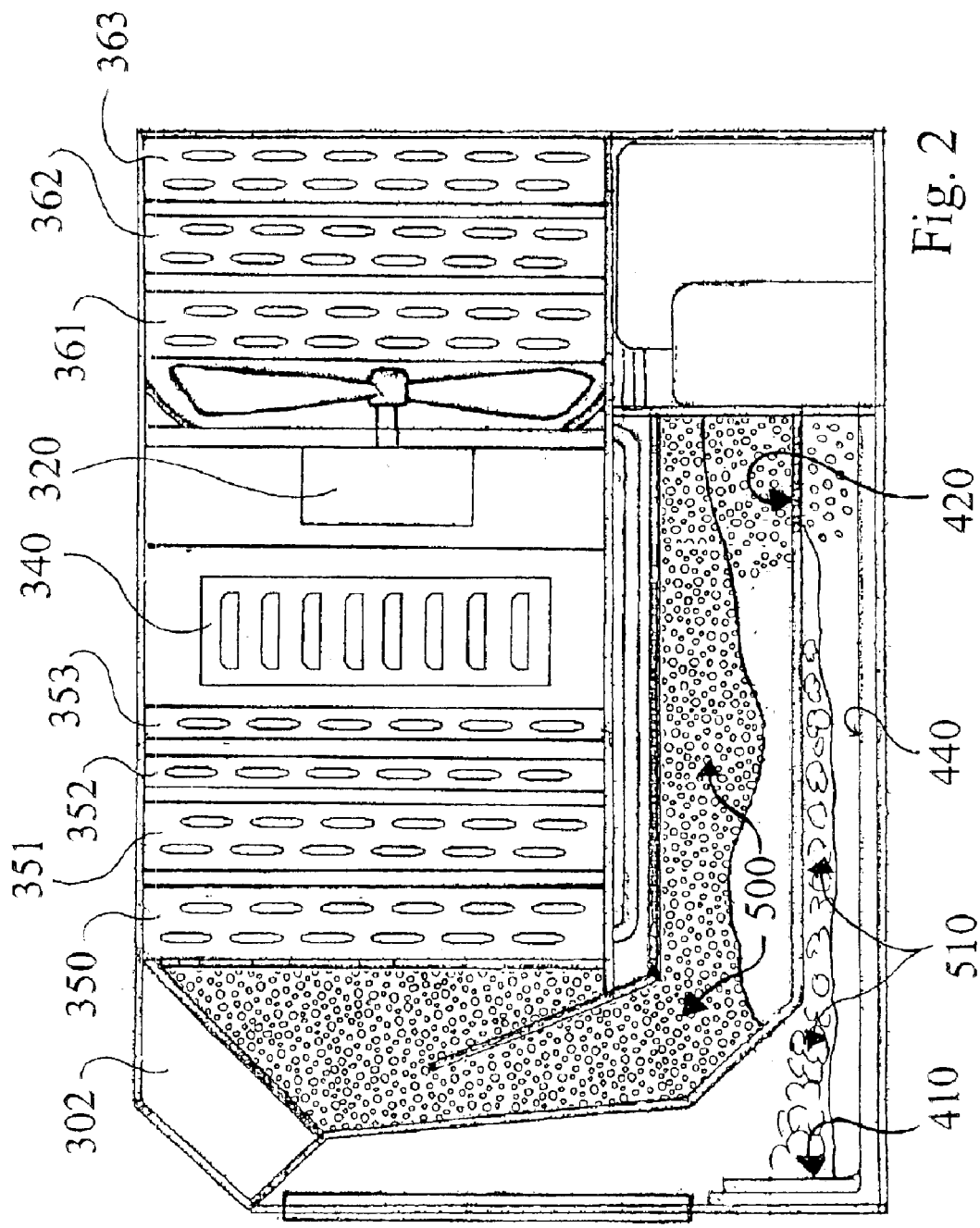
FIG. 2 is a schematic representation of a second embodiment of the aqueous-froth filter according to the present invention.

FIG. 2 illustrates an enhanced version of the apparatus of FIG. 1, wherein corresponding components are identified by reference numerals in the 300's and 400's rather than in the 100's and 200's, respectively. The version shown in FIG. 2 differs from FIG. 1 in that it utilizes dual evaporators 350,351 and dual, intermittent-duty freezer coils 352,353 to enhance the cooling of the aqueous-froth 500. Multi-stage condensers 361,362 and 363 are provided to more effectively replace heat removed from the air stream. In other respects, the embodiments of FIGS. 1 and 2 are the same, and a detailed description of FIG. 2 is not given in the interest of brevity. FIG. 2 also illustrates the micro-droplet fog 510 introduced into the contaminated incoming air stream by fogger nozzles 410, as well as aqueous-froth 500.

"Nucleation"

FIGS. 3A–3G are schematic representations illustrating the "nucleation" technique and how a single bubble 600 of the aqueous-froth is processed and how two individual contaminants 620 and 640 are trapped inside bubble 600 of the aqueous-froth and returned to the solution reservoir 440. Contaminants 620 and 640 may be extremely small, of the order of magnitude as small as 1 nanometer. Contaminants 620,640 and micro-droplets (not shown for clarity) are suspended in the saturated air inside bubble 600, the incoming air stream having been humidified or saturated by fogger nozzles prior to the air stream entering the aqueous froth. Airflow velocity drops off in the micro-atmosphere created inside bubble 600. The air resistance, due to surface friction between a relatively heavy contaminant, such as 620 and the airflow, is overcome by the acceleration of gravity, and contaminant 620 settles out onto the wet surface inside the bubble 600 (FIG. 3B). Some contaminants such as 640 remain suspended in the air, inside the bubbles.

The bubble 600 is drawn to the cold evaporative refrigerant coil 350 (0° C.) by low pressure. A localized zone of froth, proximal to the refrigerant coils, begins to cool by thermal conduction, increasing the water vapor pressure, and super saturating the air inside the bubble as shown by marks 650.

As a bubble is drawn through the evaporative refrigerant coil, the solution vapor 650 inside the bubble 600 condenses on available contaminant nuclei 620,640, trapping the contaminants 620,640 in liquid solution micro-droplets suspended in the air inside the bubbles (FIGS. 3C, 3D). This step is what is referred to herein as "nucleation."

The bubble walls condense in the cold air and on the cold surfaces of the refrigerant coil 350 (FIG. 3E), releasing the super saturated atmosphere inside the bubbles to condense onto the refrigerant coil and air, as well.

The liquid solution, with trapped contaminants 620,640, drains off the evaporative refrigerant coil 350 into the solution reservoir 440 (FIGS. 3F, 3G). Solution is kept at a preferred temperature by routing solution pipes near the condensing refrigerant coil or other heat source. The temperature of the fluid, the cooling surfaces, the input and exit air streams are determined by filtering efficiency or reactivity vs. energy consumption tradeoffs, and may be varied to optimize filter performance.

Sub-Micron Fogger Nozzles

FIGS. 4–6 illustrate sub-micron fogger nozzles which are used with the present invention. The fogger nozzles shown in FIGS. 4–6 are capable of producing sub-micron sized droplets by varying the mass of filtering solution sheared by a compressed air stream. The liquid fogger nozzle 750 (FIG. 4) uses pressurized filtering solution and compressed air to rapidly raise vapor pressure of the air stream to saturation with micron-sized droplets. When used with an effervescing solution, the liquid fogger nozzle 750 can produce a variety of sub-micron sized droplets.

The froth fogging nozzle 710 (FIGS. 5 and 6) mixes compressed air with the liquid filtering solution internally to create a spectrum of solution flows from bubbly solutions to aqueous froths. The filtering solution froth is forced through multiple metering slots convergent to a compressed air stream. The air stream shears off the froth to produce a variety of sub-micron sized droplets.

FIG. 5 schematically illustrates an assembled froth fogger nozzle 710. A central passageway 715 is fed with compressed air which flows toward the nozzle tip 720. A second bore 725 is fed with pressurized solution which also flows toward the nozzle tip 720. Bore 725 is preferably a cylindrical bore surrounding central bore 715. A frothing chamber 735 is formed adjacent nozzle tip 720. A plurality of metering ports 716 extend from central passageway 715 into fluid communication with second bore 725, and between second bore 725 and froth chamber 735. In operation, a portion of the compressed air in central passageway 715 enters second bore 725, causing a froth to begin forming, and the froth extends into froth chamber 735. The froth in chamber 735 flows through a plurality of metering slots 737 formed between froth chamber 735 and outlet passageway 721 adjacent nozzle tip 720. An O-ring seal 740 seals the rear of froth chamber 735 and forces the froth to leave chamber 735 through metering slots 737. Compressed air which does not enter metering ports 716 flows through exit passageway 721. The compressed air forces froth exiting metering slots 737 and into exit passageway 721 outwardly through nozzle tip 720. A cloud of micro-sized droplets 745 is thereby formed.

Figure 4A:
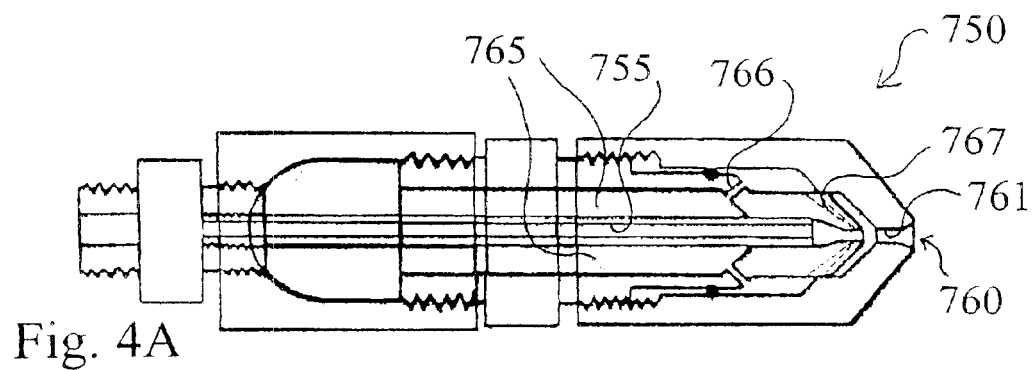
Figure 4B:
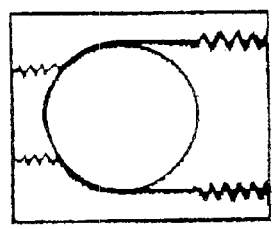
Figure 4C:
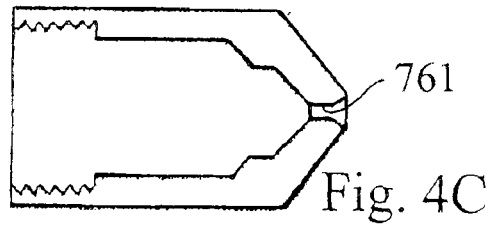
Figure 4D:
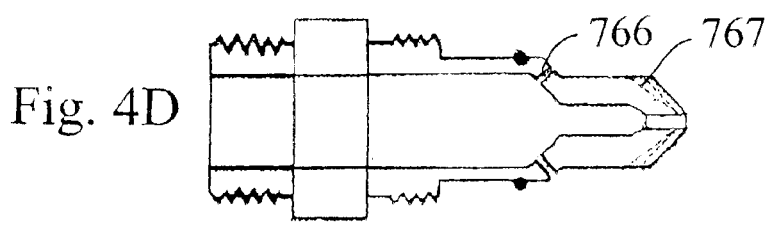
Figure 4E:
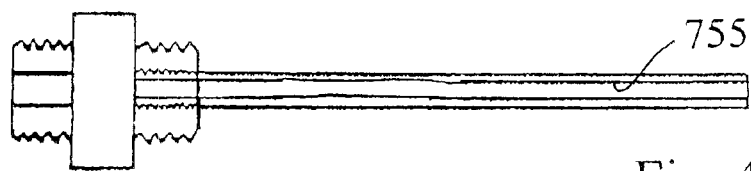
Figure 6A:
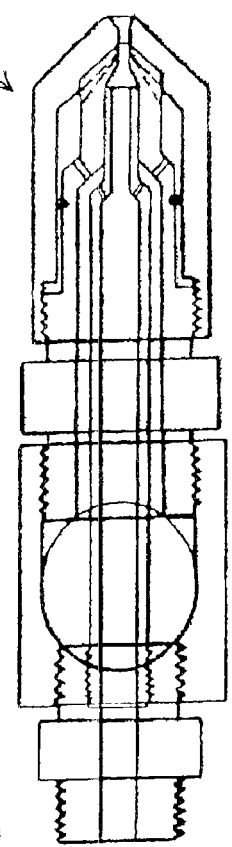
Figure 6B:
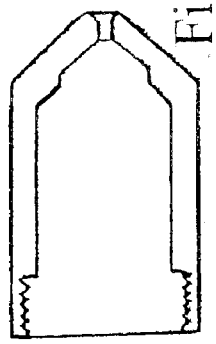
Figure 6C:
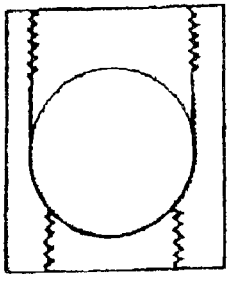
Figure 6D:
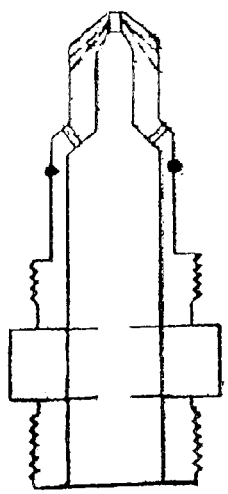
Figure 6E:
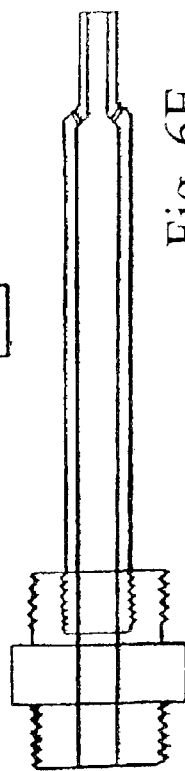

FIG. 4A illustrates an assembled liquid fogger nozzle 750. Nozzle 750 includes the four parts shown in FIGS. 4B–4E. Compressed air is fed into a central passageway 755. All of the compressed air flows directly through outlet passageway 761 through nozzle tip 760. A pressurized filtering solution is fed into second, cylindrical bore 765 and through metering ports 766 and metering slots 767 which enter outlet passageway 761 at an angle of about 45°. The liquid fogger nozzle 750 does not create a froth inside the nozzle as is the case with froth fogger nozzle 710 shown in FIG. 5.

As shown in FIG. 6, the assembled fogger nozzle 750 is built inside brass tee fittings installed in the filter solution pipeline, and are scalable in size in accordance with the size of the brass tee fittings. The four separate fittings shown in FIGS. 6B–6E are assembled as shown in FIG. 6A and FIG. 5. A compressed airline is connected to the back of the brass tee fitting. The difference in pressure between the filtering solution and the compressed air stream determines the size of the droplets formed, and the mass of filtering solution sprayed into the air stream. Metering slots from the solution line to the air stream limit the volume of solution entering the air stream. High air stream velocity creates relative low pressure in the metering slots between the solution line and the air stream. The kinetic energy of the air stream in proportion to volume of water at the shear points determines the size of the droplets produced. The adjustable nozzle cap regulates the area of the metering slot entrance ports. Sub-micron droplets are produced by high relative kinetic energy of the air stream in proportion to the mass of water sheared at a point in time. This nozzle could provide the volume of solution needed to rapidly raise solution vapor pressure to saturation in the incoming air stream.

Shearing a water stream of varying mass with a compressed air stream produces a variety of sub-micron droplet sizes. Bubbles in the solution vary the mass of the solution entering the air stream. The effervescing solution nozzle meters the pressurized filtering solution at multiple ports in the nozzle body. The solution pressure in the pipeline is maintained at the metering ports as a limited volume of solution is released into the chamber concentric to the compressed air stream. The solution effervesces in the chamber upon release of the pipeline pressure. The effervescent solution is drawn into the metering slots and the space between the metering slots in the nozzle body and the nozzle cap by low pressure created by the high velocity air stream. Metering slots distribute effervescent solution streams to shear points around the circumference of the compressed air stream. The compressed air stream shears the effervescent solution streams to produce a limited variety of sub-micron sized droplets.

The froth fogging nozzle (FIGS. 5 and 6) mixes compressed air with the pressurized solution to produce a variety of solution flows from a bubbly solution to an aqueous froth. Bubbles reduce the mass of solution at the shear points with the air stream. An aqueous froth contains the least filtering solution mass in proportion to the kinetic energy of the air stream at the shear points and produces the smallest droplets. An air chamber inside the fogger nozzle reduces airflow velocity to force bubbles into the solution stream before the nozzle constriction and relative low pressure at the shear points located at the nozzle constriction. The difference in pressure between the filtering solution and the compressed air stream regulates bubble production, material flow and droplet size.

The fogging nozzles are compact, inexpensive, and designed for in-line use alone or in fogger nozzle arrays. Multiple metering ports and metering slots prevent clogging. The adjustable nozzle cap regulates the area of the metering slot entrance ports. The adjustable nozzle caps are adaptable to computer controlled servo-motors to adjust material flow and clear clogged metering slots in a regular maintenance period for high value asset applications.

FIGS. 7–10 are schematic illustrations of various embodiments of the present invention utilizing the nucleation technique in concert with an aqueous-froth filter.

Figure 7:
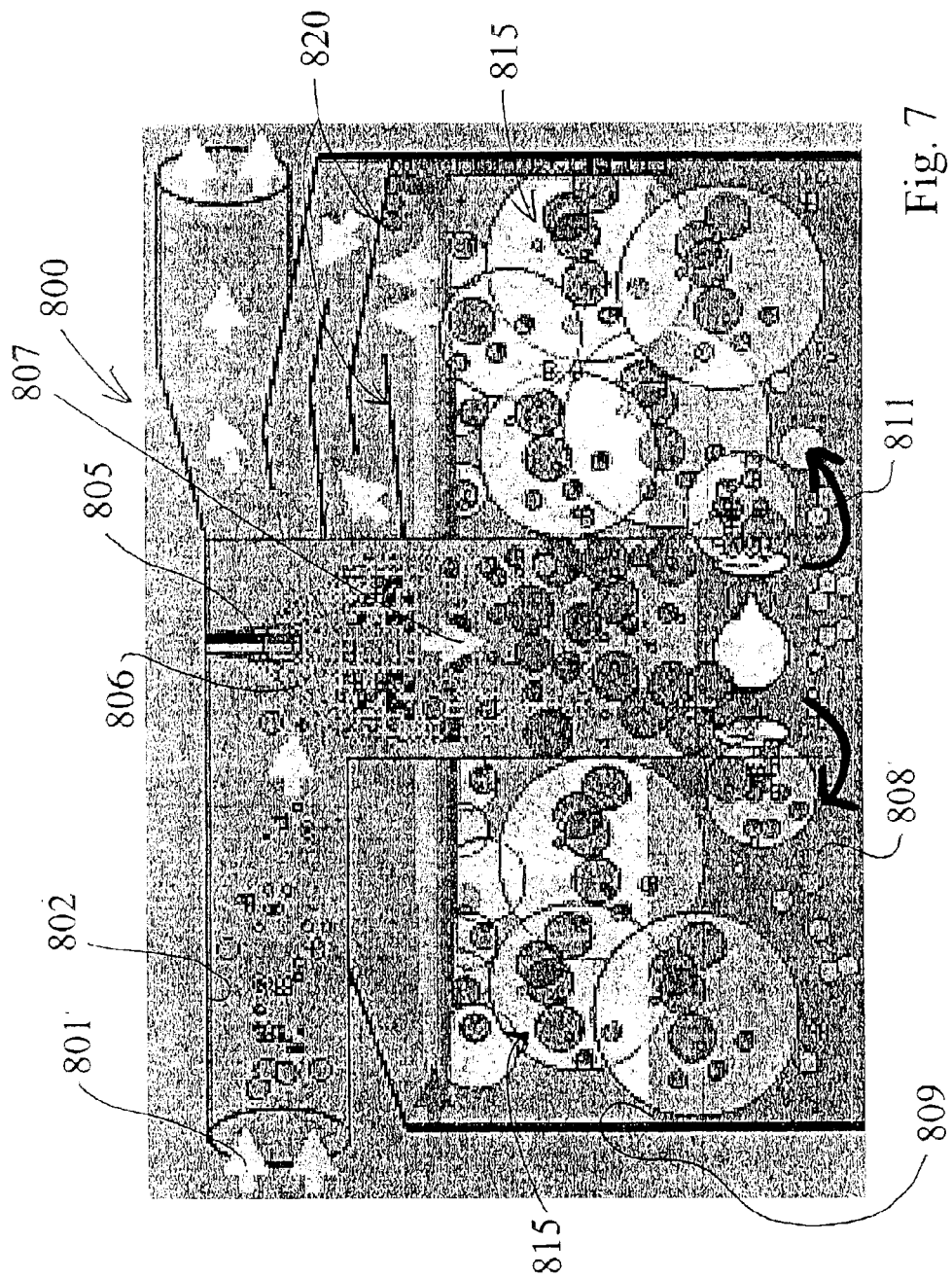
FIG. 7 is a schematic illustration of a third embodiment of the invention.

FIG. 7 illustrates a third embodiment shown generally as 800 wherein a contaminated air stream is represented by arrows 801 moving through an intake line shown as 802. A fogger nozzle system shown as 805 injects a fine mist 806 into the incoming contaminated air stream. The contaminated air stream moves downwardly as shown by arrow 807 into a liquid reservoir 808 having a liquid surface level 809. The contaminated air stream diffuses into the liquid reservoir as shown by arrows 811, causing the formation of aqueous-froth shown generally as 815. The bubbles in the aqueous froth contact cooling air and surfaces 820, causing the nucleated contaminants inside each bubble to contact the cool metallic surfaces 820. The large, condensed particles simply drain back into the liquid reservoir 808 to be decontaminated and/or disposed of.

Figure 8:
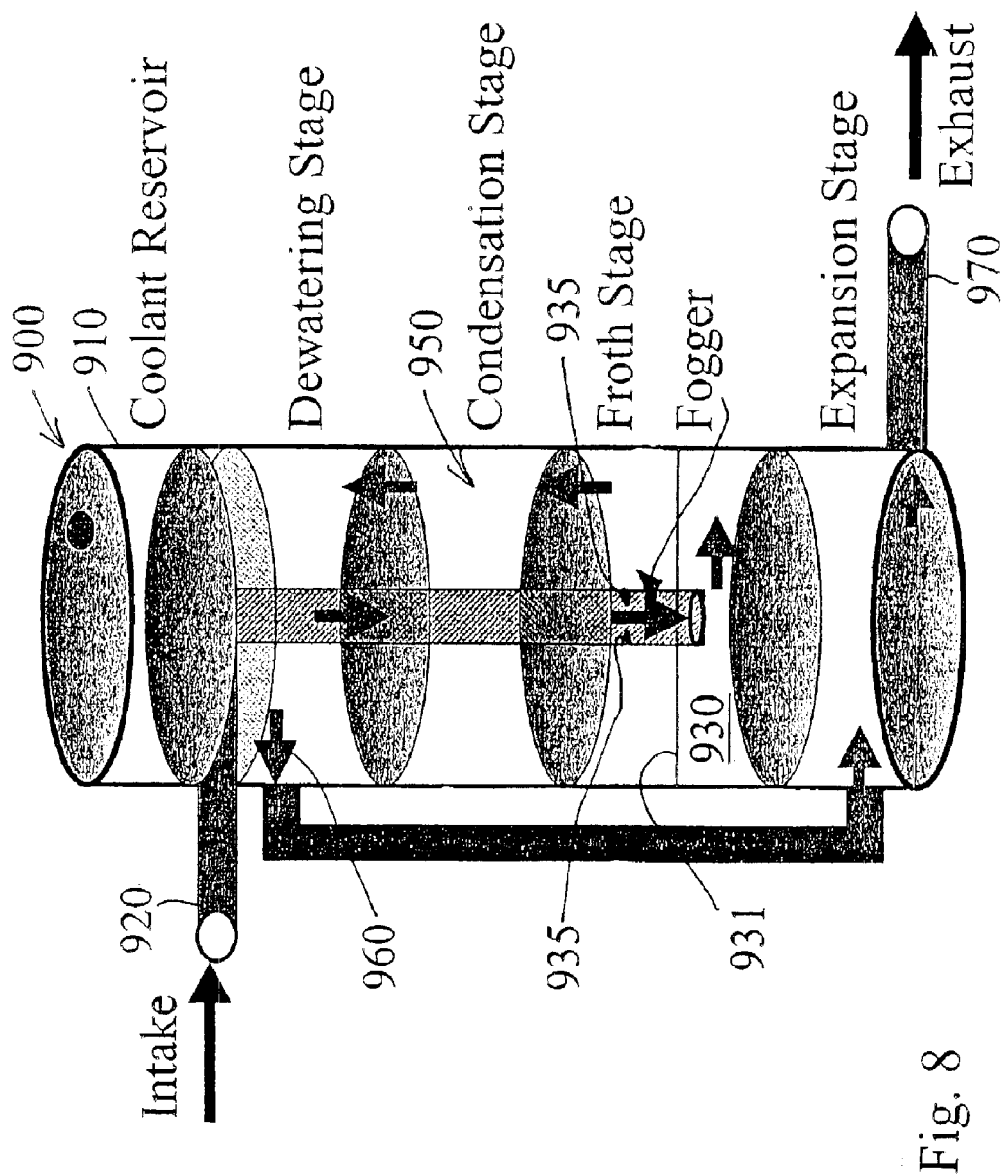
FIG. 8 is a schematic representation of a fourth embodiment of the invention.

FIG. 8 shows a fourth embodiment filter shown generally as 900 which includes the various stages of the filter arranged within a vertical and cylindrically shaped housing 910. The incoming contaminated air enters intake 920 and is forced downwardly into a liquid reservoir 930, wherein the upper surface of the liquid is shown as 931. An aqueous-froth is created immediately above the liquid surface 931 and a series of fogger nozzles 935 injects a fine mist into the incoming contaminated airstream. The bubbles of the froth move upwardly to a condensation stage shown generally as 950, when the bubbles are cooled, as described above, and the contaminants are coalesced onto cold, preferably metallic surfaces, or air and drained downwardly into the liquid reservoir 930. The decontaminated air stream 960 is pumped through a dewatering stage, typically by vacuum to an exhaust 970.

Figure 9:
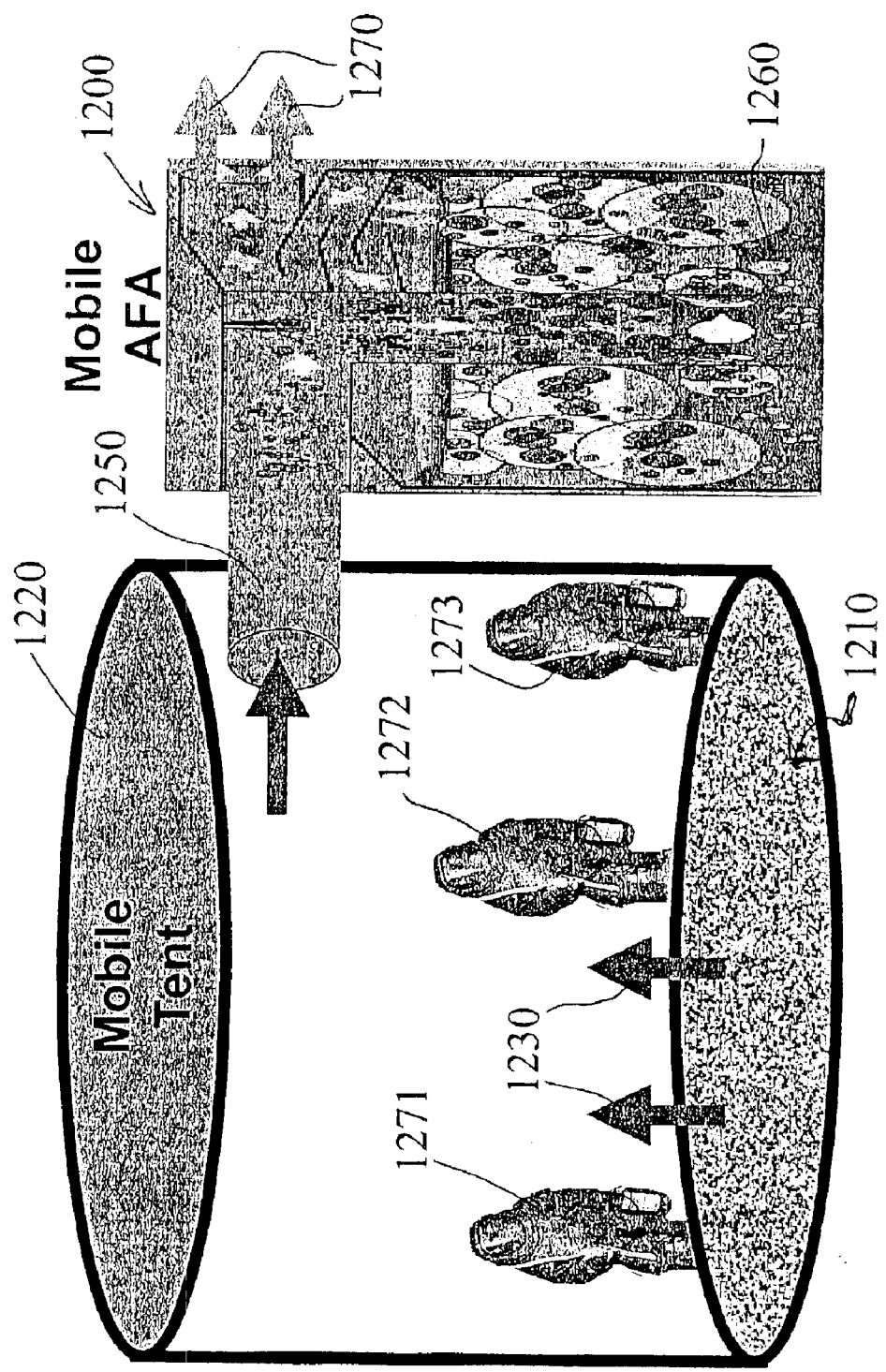
FIG. 9 is a schematic representation of a fifth embodiment utilizing a mobile tent system to assist in a clean-up operation.

FIG. 9 is a schematic illustration representing how a mobile filter according to the present invention, shown generally as 1200, may be transported to a contaminated region 1210 along with a mobile tent, shown generally as 1220. Airborne contaminants shown generally by arrows 1230 are contained within a tent or building 1220 and are introduced into the intake 1250 of mobile filter 1200, removed from the airstream and contained within decontamination liquid in reservoir 1260. Decontaminated air is exhausted into the atmosphere at 1270. Three workmen are illustrated at 1271,1272 and 1273. These workmen wear protective gear and place the mobile tent 1220 and mobile filter 1200 and move them as required by the situation. Various solutions may be used for the working fogging fluid. It is well-known that decontamination solutions containing sodium hypochlorite (bleach), EZ-Decon (Hydrogen Peroxide), caustics, oxidants, fungicides, sporicides, mold killing compounds, and other compounds will neutralize hazardous chemical and/or biological aerosols. Protection against nuclear, chemical, biological acidic, alkaline, or other hazardous aerosols, may be achieved by using a solution with desirable properties in any version of the aqueous-froth filter.

Figure 10:
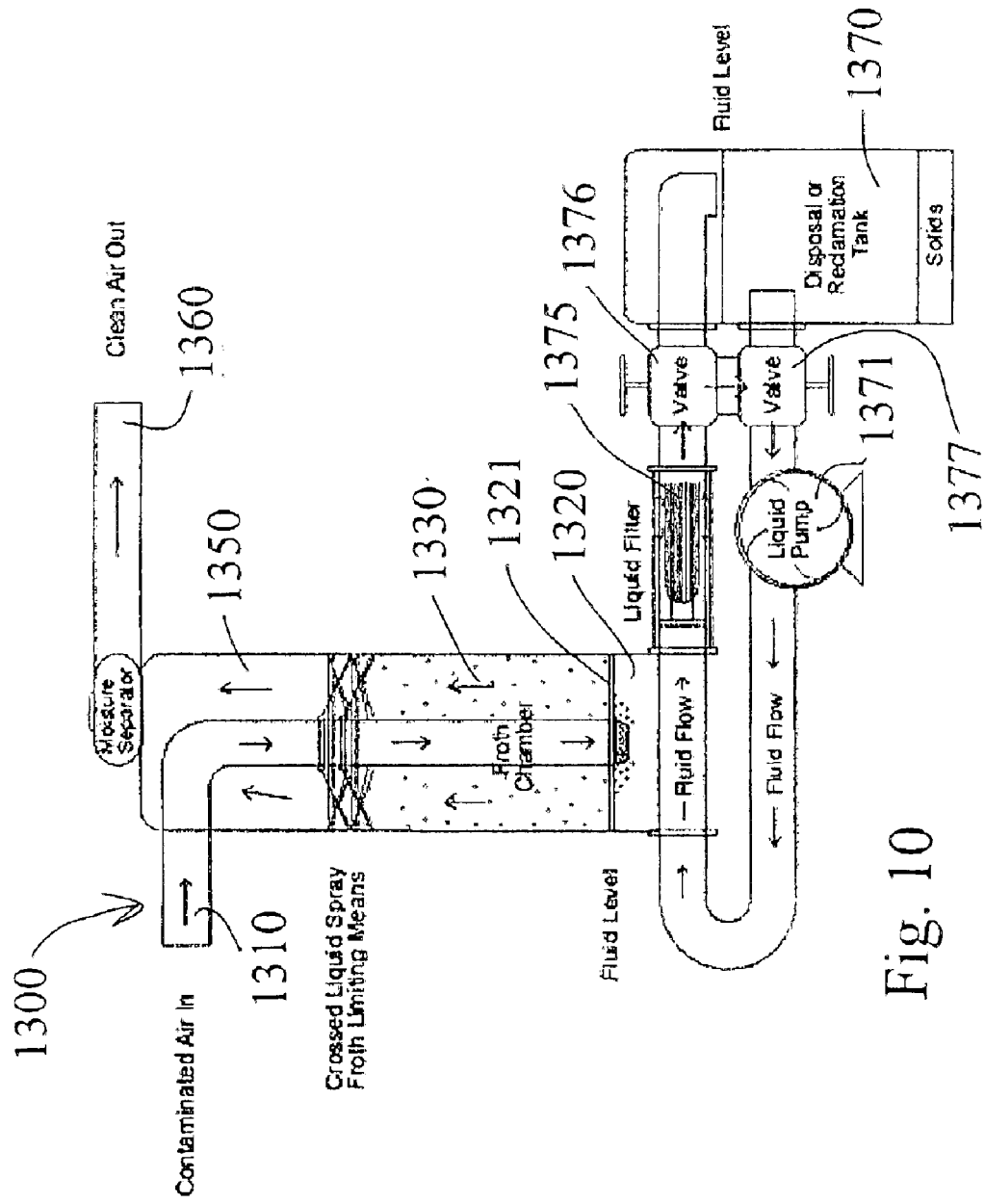
FIG. 10 is a schematic illustration of a sixth embodiment suitable for use as an industrial filter or to contain and filter air from industrial sources such as smokestacks or other processes that generate potentially harmful effluents or greenhouse gases.

FIG. 10 is a schematic illustration of a sixth embodiment of the invention. This embodiment illustrates a typical design of an industrial filter shown generally as 1300 and constructed in accordance with the present invention. Contaminated air enters intake 1310 and is forced downwardly into a liquid reservoir 1320 having a liquid surface level 1321. Fogger nozzles are not illustrated in the interest of clarity but are utilized to introduce a fine mist into the incoming airstream before the contaminated air is diffused into the liquid contained in reservoir 1320. The contaminated air stream enters the froth chamber 1330 wherein the contaminants are subjected to the nucleation described above, and are returned downwardly into the liquid reservoir 1320. The decontaminated air shown as 1350 is pumped through exhaust 1360. The contaminants are pumped from liquid reservoir 1320 into a disposal or reclamation tank 1370 by a liquid pump 1371. A liquid filter 1375 is utilized to remove as many solid contaminants as possible. Valves 1376 and 1377 are open and closed intermittently as required to remove contaminants from liquid reservoir 1320. This embodiment has the capability not only of removing hazardous aerosols, but also of reclaiming valuable industrial aerosols. It also has the capability using an appropriate solution to remove carbon dioxide or other unwanted effluents from an air stream using a custom designed solution. One such solution example would use the following reaction $2HaHCO_3 <--> Na_2CO_3+CO_2+H_2O$ to sequester $CO_2$. Many other custom designed solutions, just as example using aqueous solution absorbent such as sodium hydroxide (NaOH), may be employed using the aqueous-froth filter as a fluid and gaseous reactant chamber.

Theory of Operation

The aqueous-froth air filter removes super and sub-micron contaminants from an air stream by applying the principles of atmospheric physics to urge contact between contaminants suspended in the air stream and the surfaces of an aqueous-froth.

A wide spectrum of solution micro-droplet radii is introduced into a contaminated air stream to perform a variety of functions. Micro-droplets of different sizes possess different inertia, droplet velocity, kinetic energy, and increase contacts, collisions and coalescence with other micro-droplets and contaminants in the turbulent airflow while also providing material for nucleation.

Some micro-droplets sweep contaminants out of the air stream by contact. The phase of a fluid as a liquid or a gas is the result of intermolecular force and molecular spacing. In liquids, the molecules are each locked in a strong force field and are packed as close together as repulsive forces will allow. The molecules for gases are sufficiently far enough apart so that only weak forces act between molecules. Surface friction of a contaminant in contact with an aqueous solution overcomes the surface friction of a contaminant in the air stream resulting in trapped particles.

Some micro-droplets collide and coalesce in the dynamics of the air stream and are removed by inertia and the acceleration of gravity. The intermolecular forces and molecular spacing of liquid-to-liquid contact constitutes a strong molecular bond. Micro-droplet mass is increased by coalescence with other micro-droplets. The micro-droplets accelerate due to surface friction with the air stream, gravity adds to the inertia of the micro-droplets. High micro-droplet inertia overcomes wind resistance and the micro-droplet contacts the wet surfaces of the filter or solution or cool air or cool surfaces and contaminants are removed from the air stream.

When the surface friction between smaller micro-droplets (or contaminants) and the air stream is greater than the acceleration of gravity, the micro-droplet (or contaminant) remains suspended in the air stream. Acceleration due to surface friction of the contaminant and the air stream, the acceleration of gravity, and inertia effects contaminant velocity in an air stream. Air cushioning of less massive aerosols inhibit contact.

The smallest solution micro-droplets evaporate and raise the solution vapor pressure of the air stream. (Kelvin 1870, curvature effect) The mass and kinetic energy of molecules in liquid phase, in proportion to the surface area and surface tension of the liquid, and in inverse proportion to the vapor pressure of the atmosphere in which the droplet is suspended, limit micro-droplet size in the atmosphere. Although hygroscopic nuclei (0.001–10 micron) attract atmospheric water vapor molecules, the curvature effect limits cloud micro-droplet size to above the point at which evaporation continues without stopping until all the liquid water molecules change to vapor phase; around 20-micron, depending on localized conditions in the atmosphere. The regular atmospheric humidity and the reduced pressure of the inlet air-duct would increase micro-droplet size before irreversible phase change in the aqueous-froth filter. Depending on local conditions, micro-droplets 50 to 100- micron or larger, introduced to the air stream, may evaporate initially, with micro-droplet size of vaporization decreasing proportionally as the relative humidity of the air stream is increased by the evaporating micro-droplets.

The bubbles of the froth create micro-atmospheres that change localized conditions around contaminants suspended in the air from the dynamic environment of the air stream, to the stable atmosphere inside the bubbles. In the absence of air movement, the acceleration of gravity overcomes the acceleration imparted to the contaminant or micro-droplet by wind resistance with the contaminants' or micro-droplets' surface, the contaminants and micro-droplets settle out of the air into the wet surface inside the bubble. Micro-droplets settling out of suspension sweep contaminants out of the air. A portion of the contaminants and micro-droplets remain suspended in the air stream by molecular attraction and the buoyant forces of the saturated micro-atmosphere inside the bubbles.

An electric bias across a narrow passage in the froth duct increases micro-droplet collision-coalescence efficiency and contact between the contaminants, the solution micro-droplets, and the surfaces of the froth. Higher solution concentration includes more ions for higher current and less electrical resistance in the solution. Current is inversely proportional to the separate of electrodes. Voltage remains the same over distance. An appropriate AC bias will magnify Brownian motion increasing contact between the suspended contaminants and the wet surfaces of the aqueous froth. A DC bias mimics cloud electrodynamics, but may interrupt disproportionation of $H_2O_2$, and increase reduction by electrolysis.

A thermal conduction zone, proximal to the surfaces of the cold refrigerant coil, cools the micro-atmospheres inside the bubbles and raises the solution vapor pressure so conditions favor heterogeneous nucleation. Solution vapor condenses onto available contaminants suspended in the air, and coats each contaminant with solution. The micro-droplets formed by heterogeneous nucleation condense onto the cold surfaces of the air, the bubbles, cold surfaces and refrigerant coil.

Heat removed from the air stream by the cold evaporative coil is replaced without additional moisture. Heat of the electric motor, refrigerant compressor, fluid pump and air compressor for the fogger, when combined with the original heat removed from the air stream, reheats the air stream and increases expansion of the air volume to larger than the original air volume, reducing relative humidity to lower than the original level.

Solution reservoir temperature is maintained at 25° C. or any desired temperature by routing the filtering-solution in a pipe in thermal communication with a heat source (electric motor or air compressor to use otherwise wasted heat) or cooling source).

Sound waves vibrate the contaminants and micro-droplets into contact with each other and the wet surfaces of the froth. Positioned at the narrow passage in the froth/air duct, sound waves can disrupt bubble walls, releasing contaminants into the wet, interconnected surfaces of the aqueous-froth and cool air.

Fog may be produced using sound waves or other energetic means instead of a compressed air fogger nozzle.

Dewatering may be achieved through thermal (condensation) or mechanical (centrifugal separation) means.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of filtering super and sub-micron contaminants from a contaminated air stream, comprising the steps:
   passing said contaminated air stream into a contained aqueous solution;
   diffusing and passing said contaminated air stream through said contained aqueous solution;
   generating and continuously maintaining an aqueous-froth having wet surfaces above said contained aqueous solution and thereby forming a scrubbing chamber;
   passing said contaminated air stream through said aqueous-froth in said scrubbing chamber;
   introducing a plurality of solution droplet sizes into said contaminated air stream to urge contact between the contaminants suspended in the air stream and the wet surfaces of the aqueous froth;
   separating said contaminants from said air stream onto the surfaces of said aqueous-froth by bringing said contaminants into contact with the liquid surfaces of said aqueous-froth in said scrubbing chamber;
   transferring said contaminants from the surfaces of said aqueous-froth in said scrubbing chamber to said aqueous solution; and
   discharging the decontaminated air stream.

2. The method of claim 1, comprising the further step of urging contact between the aqueous-froth and the cold surfaces of air or a refrigerant coil cooled by a liquid.

3. The method of claim 1, comprising the further step of urging contact between the aqueous-froth and the cold surfaces of any cooling device.

4. The method of claim 1, comprising the further step of urging contact between the aqueous-froth and the cold surfaces of cooling coils, continuously cooled by cold water at approximately 0° C. to limit the froth to a predetermined volume, dewater the froth and dehumidify the air stream.

5. The method of claim 1, comprising the further step of limiting said froth to a predetermined volume by a spray of aqueous drops.

6. The method of claim 1, comprising the further step of removing drops from the air stream by a centrifugal droplet separator.

7. The method of claim 1, comprising the further step of maintaining the temperature of the solution (to maximize the change of phase from the solution vapor phase to the liquid solution phase).

8. The method of claim 1, comprising the further step of maintaining the temperature of the solution, vapor, or air at desired temperature and humidity to optimize filtration efficiency.

9. The method of claim 1, wherein said contaminated air stream is drawn into said aqueous solution and contaminants neutralized by chemical reaction.

10. The method of claim 1, wherein said contaminated air stream is drawn into said aqueous solution and contaminants are reclaimed by chemical reaction.

11. The method of claim 1, wherein said contaminated air stream is drawn into said aqueous solution and contaminants contained in solution for subsequent processing.

12. The method of claim 1, wherein said contaminated air stream is drawn into said aqueous solution and contaminants are filtered from the solution and concentrated for subsequent processing.

13. The method of claim 1, wherein said contaminated air stream is drawn into said aqueous solution by applying a pressure differential to said contaminated air stream.

14. The method of claim 13, wherein said decontaminated air stream is discharged under negative relative pressure toward a vacuum source.

* * * * *